United States Patent
Zhao et al.

(10) Patent No.: US 11,356,672 B2
(45) Date of Patent: Jun. 7, 2022

(54) SYSTEM AND METHOD FOR CONTROLLING VIDEO CODING AT FRAME LEVEL

(71) Applicant: SZ DJI TECHNOLOGY CO., LTD., Shenzhen (CN)

(72) Inventors: Liang Zhao, Shenzhen (CN); Wenyi Su, Shenzhen (CN); Lei Zhu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/931,155

(22) Filed: May 13, 2020

(65) Prior Publication Data

US 2020/0275104 A1    Aug. 27, 2020

Related U.S. Application Data

(63) Continuation of application No. PCT/CN2017/113926, filed on Nov. 30, 2017.

(51) Int. Cl.
*H04N 19/149* (2014.01)
*H04N 19/142* (2014.01)

(52) U.S. Cl.
CPC ......... *H04N 19/149* (2014.11); *H04N 19/142* (2014.11)

(58) Field of Classification Search
CPC ........................... H04N 19/142; H04N 19/149
(Continued)

(56) References Cited

U.S. PATENT DOCUMENTS

2006/0133480 A1*   6/2006   Chang .................... H04N 19/61
                                                                                 375/240.03
2010/0183069 A1   7/2010   Chen et al.
(Continued)

FOREIGN PATENT DOCUMENTS

CN         104885455 A     9/2005
CN           1910934 A     2/2007
(Continued)

OTHER PUBLICATIONS

Tao-Sheng Ou, et al., A Perceptual-Based Approach to Bit Allocation for H.264 Encoder, Visual Communications and Image Processing 2010, Proc. of SPIE, Jul. 2010, vol. 7744.
(Continued)

*Primary Examiner* — On S Mung
(74) *Attorney, Agent, or Firm* — Anova Law Group, PLLC

(57) ABSTRACT

A method for controlling video coding includes obtaining a target rate for an image data unit to be encoded using one or more coding parameters. The one or more coding parameters are determined based on the target rate and a rate control model associated with one or more model parameters. The method further includes determining the one or more model parameters associated with the rate control model based on an encoding of one or more reference image data units using one or more reference coding parameters, determining the one or more coding parameters for encoding the image data unit based on the target rate and the rate control model associated with the one or more determined model parameters, and using the one or more determined coding parameters to encode the image data unit.

18 Claims, 13 Drawing Sheets

(58) Field of Classification Search
USPC .................................................. 375/240.03
See application file for complete search history.

(56) References Cited

U.S. PATENT DOCUMENTS

| | | | |
|---|---|---|---|
| 2011/0007977 A1 | 1/2011 | Amonou et al. | |
| 2011/0075730 A1 | 3/2011 | Samuelsson et al. | |
| 2011/0200115 A1 | 8/2011 | Hayashi et al. | |
| 2012/0140066 A1* | 6/2012 | Lin .................... | H04N 7/18 348/143 |
| 2013/0272389 A1 | 10/2013 | Sze et al. | |
| 2015/0373328 A1* | 12/2015 | Yenneti ................ | H04N 19/12 375/240.03 |
| 2016/0073111 A1 | 3/2016 | Lee et al. | |
| 2016/0373767 A1 | 12/2016 | Yang et al. | |
| 2017/0013261 A1 | 1/2017 | Lin et al. | |
| 2017/0048522 A1 | 2/2017 | Schoenblum et al. | |
| 2018/0020238 A1 | 1/2018 | Liu et al. | |
| 2019/0349607 A1 | 11/2019 | Kadu et al. | |

FOREIGN PATENT DOCUMENTS

| | | |
|---|---|---|
| CN | 101083768 A | 12/2007 |
| CN | 101141636 A | 3/2008 |
| CN | 101262603 A | 9/2008 |
| CN | 101674472 A | 3/2010 |
| CN | 101867802 A | 10/2010 |
| CN | 102148978 A | 8/2011 |
| CN | 102595143 A | 7/2012 |
| CN | 103313047 A | 9/2013 |
| CN | 103561270 A | 2/2014 |
| CN | 104113761 A | 10/2014 |
| CN | 104754361 A | 7/2015 |
| CN | 105049853 A | 11/2015 |
| EP | 1835750 A1 | 9/2007 |
| EP | 2120463 A1 | 11/2009 |
| EP | 2301251 A1 | 3/2011 |
| JP | H0479587 A | 3/1992 |
| WO | 2009157827 A1 | 12/2009 |
| WO | 2010005691 A1 | 1/2010 |

OTHER PUBLICATIONS

C. Rosewarne, et al., High Efficiency Video Coding (HEVC) Test Model 16 (HM16) Improved Encoder Description Update 9, Joint Collaborative Team on Video Coding (JCT-VC), 28th Meeting, Jul. 2017.

The World Intellectual Property Organization (WIPO) International Search Report and Written Opinion for PCT/CN2017/113848 dated Aug. 21, 2018 7 Pages.

The World Intellectual Property Organization (WIPO) International Search Report and Written Opinion for PCT/CN2018/074568 dated Aug. 29, 2018 8 Pages.

The World Intellectual Property Organization (WIPO) International Search Report and Written Opinion for PCT/CN2017/113926 dated Aug. 21, 2018 7 Pages.

* cited by examiner

SYSTEM AND METHOD FOR CONTROLLING VIDEO CODING AT FRAME LEVEL

CROSS-REFERENCE TO RELATED APPLICATION

This application is a continuation of International Application No. PCT/CN2017/113926, filed Nov. 30, 2017, the entire content of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The disclosed embodiments relate generally to video processing, more particularly, but not exclusively, to video coding.

BACKGROUND

The consumption of video content has been surging in recent years, mainly due to the prevalence of various types of portable, handheld, or wearable devices. Typically, the video data or other media content is encoded at the source into an encoded (compressed) bit stream, which is then transmitted to a receiver over a communication channel. It is important, however, to control the bit rate of encoded bit streams in order to ensure that various constraints of the sender, the receiver, and/or the communication channel are met. For instance, it may be desirable to keep the bit rate of the encoded video frames below a certain maximum bit rate so as to prevent buffer overflow or to accommodate a bandwidth limitation. This is the general area that embodiments of the disclosure are intended to address.

SUMMARY

Described herein are systems and methods that can control video coding. A video encoder can obtain a target rate to encode an image data unit such as an image frame, wherein the image data unit is to be encoded based on a rate control model with one or more model parameters. The video encoder can determine values of the one or more model parameters for the rate control model based on an encoding of one or more reference image data units using one or more reference coding parameters. Then, the video encoder can determine values of one or more coding parameters for encoding the image data unit, based on the rate control model with the one or more determined model parameters, and use the one or more determined coding parameters to encode the image data unit.

Also described herein are systems and methods that can control video coding. A video encoder can obtain an image frame, wherein the image frame comprises a plurality of coding block groups, wherein each coding block group includes one or more coding blocks and each coding block group is associated with a coding control model. Furthermore, the video encoder can determine values of one or more coding parameters, for a first coding control model associated with a first coding block group, based on a bit allocation for the first coding block group, and use the first coding control model with the one or more determined coding parameters to encode the first coding block group.

DETAILED DESCRIPTION

The disclosure is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the disclosure as following uses the H.264 standard and the High Efficiency Video Coding (HEVC) standard as examples for coding methods. It will be apparent to those skilled in the art that other types of coding methods can be used without limitation.

In accordance with various embodiments of the present disclosure, the system can control video coding for achieving coding efficiency at frame level. A video encoder can obtain a target rate to encode an image data unit such as an image frame, wherein the image data unit is to be encoded based on a rate control model with one or more model parameters. The video encoder can determine value of the one or more model parameters for the rate control model based on an encoding of one or more reference image data units using one or more reference coding parameters. Then, the video encoder can determine value of one or more coding parameters for encoding the image data unit, based on the rate control model with the one or more determined model parameters, and use the one or more determined coding parameters to encode the image data unit.

In accordance with various embodiments of the present disclosure, the system can control video coding within image frame, such as at basic unit level, for achieving coding efficiency. A video encoder can obtain an image frame, wherein the image frame comprises a plurality of coding block groups, such as basic units, wherein each coding block group includes one or more coding blocks and each coding block group is associated with a coding control model. Furthermore, the video encoder can determine values of one or more coding parameters, for a first coding control model associated with a first coding block group, based on a bit allocation for the first coding block group, and use the first coding control model with the one or more determined coding parameters to encode the first coding block group.

Figure 1:
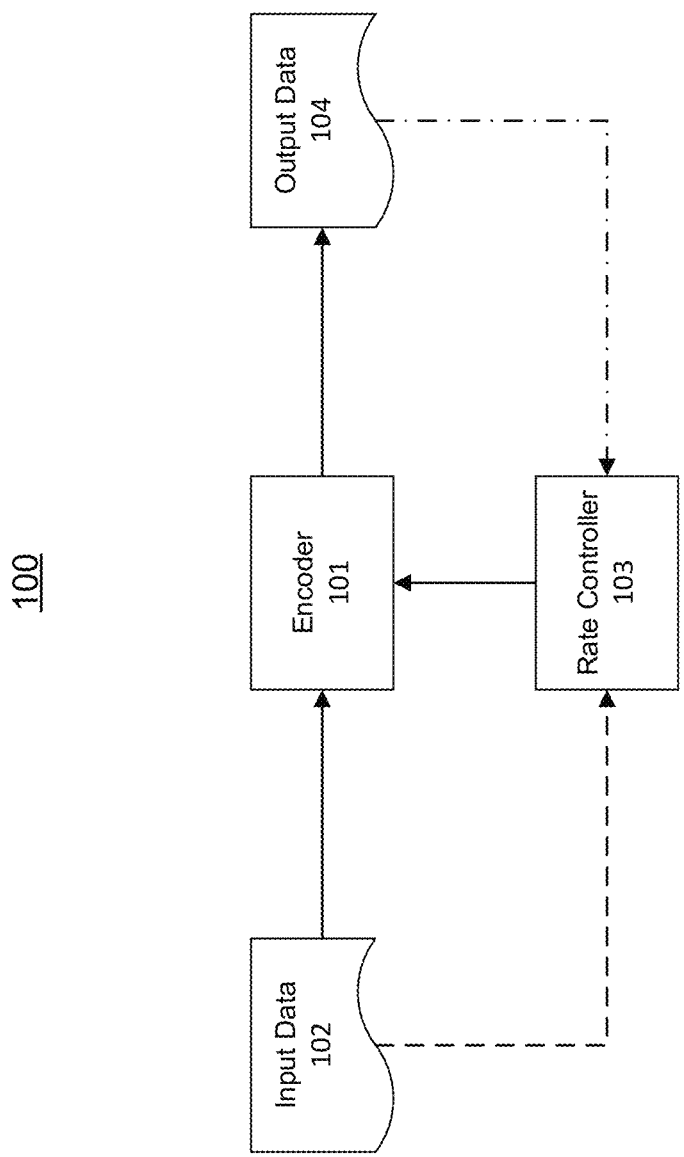
FIG. 1 illustrates an exemplary system for implementing coding rate control, in accordance with various embodiments of the present disclosure.

FIG. 1 illustrates an exemplary system 100 for implementing coding rate control, in accordance with various embodiments of the present disclosure. As shown in FIG. 1, an encoder 101 can be configured to receive and encode input data 102 to produce output data 104. For instance, the encoder 101 may be configured to receive videos as input data 102, and encode the input video data to produce one or more compressed bit streams as output data 104.

During data encoding, the encoder 101 may be configured to control the bit size of the encoded data (and hence the bit rate), e.g. via a rate controller 103. The encoder 101 and the rate controller 103 may be implemented by the same or different computing devices. In some embodiments, the rate controller 103 may form an integral part of the encoder 101; or vice versa. The encoder 101 is configured to receive input data 102, encode the input data 102, and provide output data 104 comprising the encoded data. The input data 102 can include text, images, graphic objects, animation sequences, audio recordings, videos, or any other data that needs to be encoded. In some cases, the input data 102 may include sensing data from one or more sensors such as vision sensors (e.g., cameras, infrared sensors), microphones, proximity sensors (e.g., ultrasound, lidar), position sensors, temperature sensors, touch sensors, and the like.

Encoding of the input data 102 can involve data compression, encryption, error encoding, format conversion, and the like. For example, multimedia data such as video or audio may be compressed to reduce the number of bits that are transmitted over the network. Sensitive data such as financial information and personal identification information may be encrypted before being transmitted or stored to protect confidentiality and/or privacy. Thus, the encoding of the input data 102 can be beneficial for efficient and/or secure transmission or storage of the data.

In accordance with various embodiments of the present disclosure, an encoder 101 may be configured to encode a series of video or image frames. In some embodiments, the encoder 101 may implement one or more different codecs. Each of the one or more codecs may take advantage of various codes, instructions or computer programs that implement different encoding algorithms. A suitable codec may be selected to encode a given set of input data based on various factors, including the types and/or sources of input data, the receiving entities of the encoded data, availability of computing resources, network environment, business requirements, regulations and standards, and the like.

Figure 2:
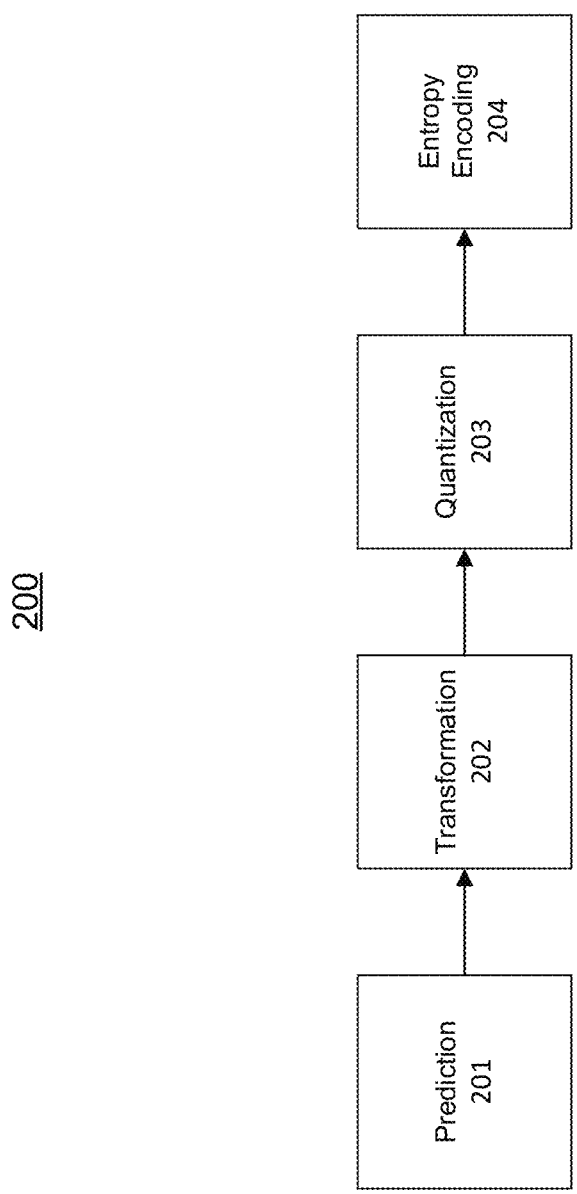
FIG. 2 illustrates encoding/compressing a video, in accordance with various embodiments of the present disclosure.

FIG. 2 illustrates encoding/compressing a video, in accordance with various embodiments of the present disclosure. As shown in FIG. 2, data in each frame may be encoded using a series of steps, such as a prediction step 201, a transformation step 202, a quantization step 203 and an entropy encoding step 204.

In accordance with various embodiments, the prediction step 201 can be employed for reducing redundant information in the image frame. The prediction step 201 can include intra-frame prediction and inter-frame prediction. The intra-frame prediction may be performed based solely on information that is contained within the current frame, independent of other frames in the video sequence. For example, the encoding process can be used to encode intra frames (I frames) based primary or entirely on spatial information contained within the intra frame (or I frame). Inter-frame prediction can be performed by eliminating redundancy in the current frame based on a reference frame, e.g. a previously processed frame. For example, the encoder 103 may be configured to exploit temporal redundancy between the frames and encode inter frames (e.g., P frames or B frames) based on forward and/or backward predictions made from previous and/or subsequent frames.

In accordance with various embodiments, a frame may be forward and/or backward predicted for inter-frame prediction based on a previous frame and/or a subsequent frame by estimating motion of the camera and/or objects in the video. For example, in order to perform motion estimation for inter-frame prediction, a frame can be divided into a plurality of image blocks. Each image block can be matched to a block in the reference frame, e.g. based on a block matching algorithm. In some embodiments, a motion vector (MV), which represents an offset from the coordinates of an image block in the current frame to the coordinates of the matched image block in the reference frame, can be computed. Also, the residuals, i.e. the difference between each image block in the current frame and the matched block in the reference frame, can be computed and grouped. The system can process the residuals for improving coding efficiency. For example, transformation coefficients can be generated by applying a transformation matrix (and its transposed matrix) on the grouped residuals.

Any suitable motion estimation techniques may be used to determine the motion vectors between adjacent frames, including pixel based methods (e.g., block-matching) and feather based methods (e.g., corner detection). If an acceptable match of a corresponding data unit (e.g., macroblock) is not found, then the encoder may encode the data unit as an intra data unit. In various embodiments, the predicted frame may be subtracted from its reference to generate the residual (error) frame. The data included in the residual (error) frame may be spatially encoded in a similar fashion as for an intra-frame. For example, one or more data matrices of the residual error frame may be transformed (e.g., using DCT) and quantized. The quantized transform coefficients of the residual error frame, the motion vectors or the difference between motion vectors of adjacent frames, along with any other suitable data needed to reconstruct the frame may be entropy encoded. The bit rate of the encoded data may be controlled at least in part by a quantization parameter provided by a rate controller.

During the transformation step 202, the input data and/or the residuals may be transformed into a different domain (e.g., spatial frequency domain) suitable for the data content of the input data (e.g., video). Any suitable coding transformation techniques may be used, including Fourier-type transforms such as discrete cosine transform (DCT) or modified DCT. For example, a DCT matrix is determined based on a size of the data unit. The data unit may include a block of 4×4 or 8×8 pixels, a macroblock of 16×16 pixels, or any suitable set of data. The DCT matrix is then applied to the data unit using matrix multiplication, yielding a transformed matrix comprising transformation coefficients.

Subsequently, the transformation coefficients can be quantized at a quantization step 203 and can be encoded at an entropy encoding step 204. At the quantization step 203, the coefficients in the transformed matrix may be quantized, for example, by dividing each coefficient by a corresponding element in a quantization matrix, and then rounding to the nearest integer value. The quantization matrix may be derived using a quantization parameter (also referred to as a quantization index). For example, the quantization parameter may be the value for each element of the quantization matrix. In another example, some or all of the elements in the quantization matrix may be scaled (multiplied or divided) by the quantization parameter and the scaled quantization matrix may be used to quantize the transformed matrix. The quantization parameter may be an integer within a certain range (e.g., between and including 0 and 128). Typically, the higher the value of the quantization parameter, the larger the quantization step size is and the larger the element values are in the quantization matrix. This may cause more transformation coefficients to be quantized to zero or near-zero. The more zero or near-zero coefficients there are, the less bits are required to encode the coefficients, resulting in lower bit size (and hence lower bit rate) for the data unit represented by the coefficients. The opposite is also true, that is, a lower value of a quantization parameter corresponds to a smaller quantization step size, a greater number of bits required to encode the quantized coefficients, and a higher bit size (and hence higher bit rate) for the data unit encoded using the quantization parameter. Techniques are provided herein for controlling the bit rate of the encoded input data by varying the quantization parameters used to encode portions of the input data.

At the entropy encoding step 204, the quantized coefficients in a quantized matrix can be scanned in a predetermined order and encoded using any suitable coding technique. For example, since most of the non-zero DCT coefficients are likely concentrated in the upper left-hand corner of the matrix, a zigzag scanning pattern from the upper left to the lower right is typical. Alternative scanning order such as a raster scan may be used. The scanning order may be used to maximize the probability of achieving long runs of consecutive zero coefficients. The scanned coefficients can then be encoded using run-length encoding, variable-length encoding, or any other entropy encoding techniques, to generate the output data 104.

Then, the bit stream including information generated from the entropy encoding step 104, as well as other encoding information (e.g., intra-frame prediction mode, motion vector) can be stored and/or transmitted to a decoder (not shown) at the receiving end. The decoder may be configured to perform decoding steps that are the inverse of the encoding steps of the encoder in order to generate reconstructed data. The decoder can perform a reverse process (such as entropy decoding, dequantization and inverse transformation) on the received bit stream to obtain the residuals. Thus, the image frame can be decoded based on the residuals and other received decoding information. In various embodiments, the reconstructed data (i.e. the decoded image) may then be displayed or played back. For example, to decode intra encoded data (e.g., I frames), the decoding steps may include an entropy decoding step (e.g., using variable length decoding), an inverse quantization step, and an inverse transform step (e.g., using Inverse Discrete Cosine Transform (IDCT)) that perform the inverse of the corresponding entropy encoding, quantization, and transform steps of the encoder. To decode inter encoded data (e.g., B frames or P frames), the decoding process can include additional motion compensation support.

Referring to FIG. 1, the rate controller 103 may be configured to control the bit rate of the output data by providing the encoder 101 with one or more coding parameters (also referred to as rate control parameters). The bit rate may be controlled to be within a certain range (e.g., below a maximum bit rate, above a minimum bit rate) or close to a target average bit rate. Alternatively, the bit rate may be controlled to vary depending on the complexity of the frames, bandwidth limit, buffer capacity, and other factors. The coding parameters can include one or more quantization parameters (QPs) for controlling the quantization step of the encoding process and hence the bit rate of the resulting output data. The quantization parameters may include, for example, a quantization step size, a value indicative of or related to a quantization step size such as a QP used in H.264 or similar encoders, a quantization matrix or a reference thereof, and the like. The coding parameters may include parameters for controlling other aspects of the encoding process such as the prediction step, the transform step, and/or the entropy encoding step. For instance, coding parameters may include a cutoff index used for removing certain high frequency coefficients before the coefficients are entropy encoded. Other examples of the coding parameters may include bit allocation information (e.g., maximum, minimum, or target bits allocated for encoding a data unit), a frame rate, a size of a data unit to be transformed and quantized, motion detection thresholds used to determine whether to code or skip coding a data unit (e.g., macroblock), Lagrange multiplier used in rate distortion optimization, algorithms and parameters used for the prediction, transform, and/or entropy encoding steps, and the like.

The rate controller 103 may be configured to control rate (e.g., by providing the code parameters) based at least in part on output information about the output data 104 and/or the encoder 101. The output information may be provided by the encoder 101 or optionally derived by the rate controller 103 based on the output data 104. The output information may include, for example, a number of bits used to encode a data unit (e.g., a frame, a slice, a macroblock), parameters (including algorithms) used to encode the data unit, encoder resource information (e.g., CPU/memory usage, buffer usage), and the like. Such information may be used by the rate controller 103 to adjust one or more coding parameters (e.g., a quantization parameter) for one or more subsequent data units.

The rate controller 103 may optionally be configured to control rate based at least in part on input information about the input data 102. Input information may include any characteristics of the input data that may be used for rate control, such as resolution, size, image complexity, texture, luminance, chrominance, motion information, and the like. For example, highly complex input data may be encoded with a higher bit rate than less complex input data.

In some embodiments, the rate controller 103 may be configured to control rate based on one or more rate control threshold parameters. The values of the threshold parameters may be predefined and/or dynamically updated by a user, a system administrator, the rate controller 103, or any other component or device. The rate control threshold parameters may be used to derive coding parameters. In some embodiments, the threshold values used to determine the coding parameters for encoding a given slice may vary depending on an encoding order of the slice relative to other slices of a frame.

In some embodiments, the rate controller 103 may be configured to control rate based on additional information. Such information may include decoder information from an entity configured to receive, decode, and/or playback or display the output data 108. For example, such information may be related to the decoder buffer usage, delay, noise, and/or playback quality. Additionally, such information may be related to the current computing environment (e.g., network bandwidth, workload), user instructions, or any other suitable information relevant to rate control.

In accordance with various embodiments, the output data 104 may be stored at a local or remote data store and/or provided to a local or remote decoder. The output data 104 may be transmitted over a communication channel. Exemplary communication channels include wired or wireless networks such as the Internet, storage area network (SAN), local area networks (LAN), wide area networks (WAN), point-to-point (P2P) networks, Wi-Fi network, radio communication, and the like.

The following discussion focus on the encoding of input data comprising single value pixel data. However, it is understood that the techniques discussed herein can be extended to input data where each pixel is represented by multiple data values corresponding to multiple components, such as color space channels. For instance, a block of image data may be represented by multiple blocks of the same size or different size, each block comprising pixel data related to a particular component or channel of a color space associated with the image data. In one example, an 8×8 block of YCbCr encoded image data may be represented by an 8×8 block of Y (luma) data and two blocks of chrominance data corresponding to Cb and Cr channels respectively (e.g. the sizes of which corresponds to different sample rates). The encoding steps discussed herein can be applied to each of the luma and chrominance data blocks in order to encode the entire input data.

Figure 3:
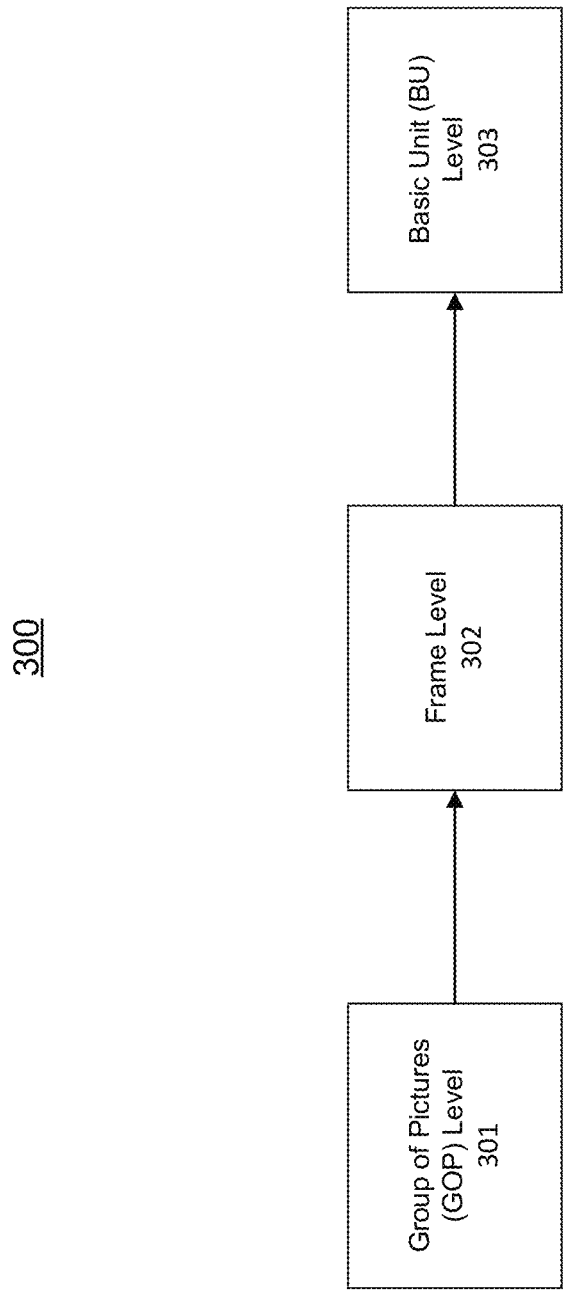
FIG. 3 illustrates a series of exemplary data levels, in accordance with various embodiments of the present disclosure.

In accordance with various embodiments of the present disclosure, video encoding and rate control can be implemented at any suitable data level or levels. FIG. 3 illustrates a series of exemplary data levels 300, which may include group of pictures (GOP) level 301, frame level 302, and basic unit level 303. In various embodiments, a group of pictures (GOP) may refer to a collection of successive (or non-successive) pictures within a coded video stream. For example, a GOP may comprise a stream of image frames including both intra and inter prediction frames. Alternatively, a GOP may comprise a plurality of inter prediction frames only.

In various embodiments, video coding techniques may be applied on different basic units. The basic unit level may be defined differently for different coding standards or applications. For example, in H.264, the basic unit level may be slice level, macroblock level, block level, pixel level, and/or the like. Alternatively, in HEVC, the basic unit level may be coding tree unit (CTU) level, coding unit (CU) level, and/or the like.

Figure 4:
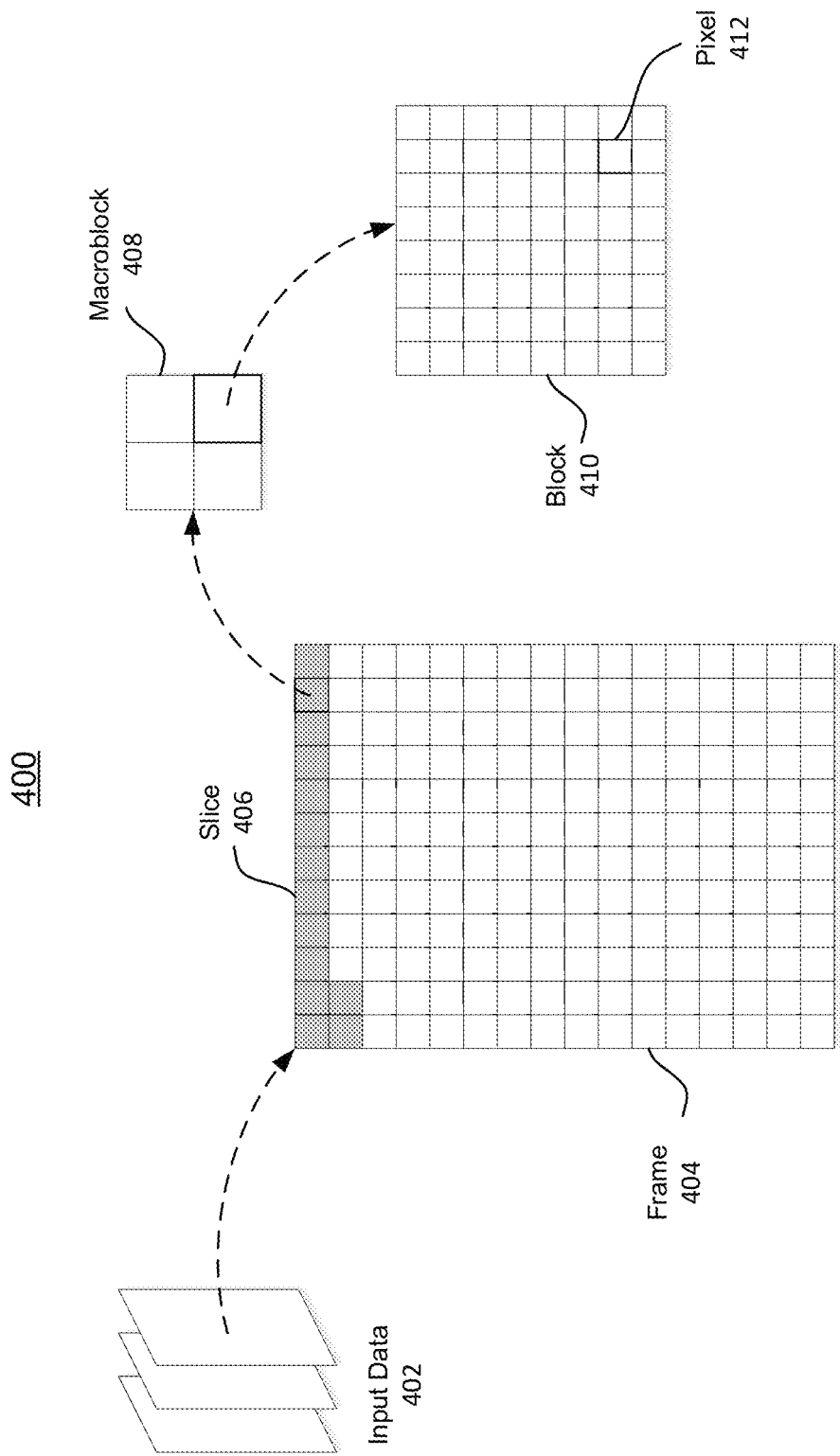
FIG. 4 illustrates exemplary data units to be encoded, in accordance with various embodiments of the present disclosure.

FIG. 4 illustrates exemplary data units to be encoded, in accordance with various embodiments of the present disclosure. As illustrated, in H.264, a data unit may refer to a frame, a slice, a macroblock, a blocks, a pixel, or a group of any of the above. For example, in an exemplary system 400 supporting H.264, an input data 402 can comprise a plurality of image frames, such as consecutive image frames in a video stream. A frame 404 may comprise one or more slices 406, and each slice may comprise one or more macroblocks 408. Furthermore, a macroblock 408 may comprise one or more blocks 410, each of which may comprise one or more pixels. For example, a pixel 412 may comprise one or more sets of data corresponding to one or more data components such as luminance data component and chrominance data component.

Figure 5:
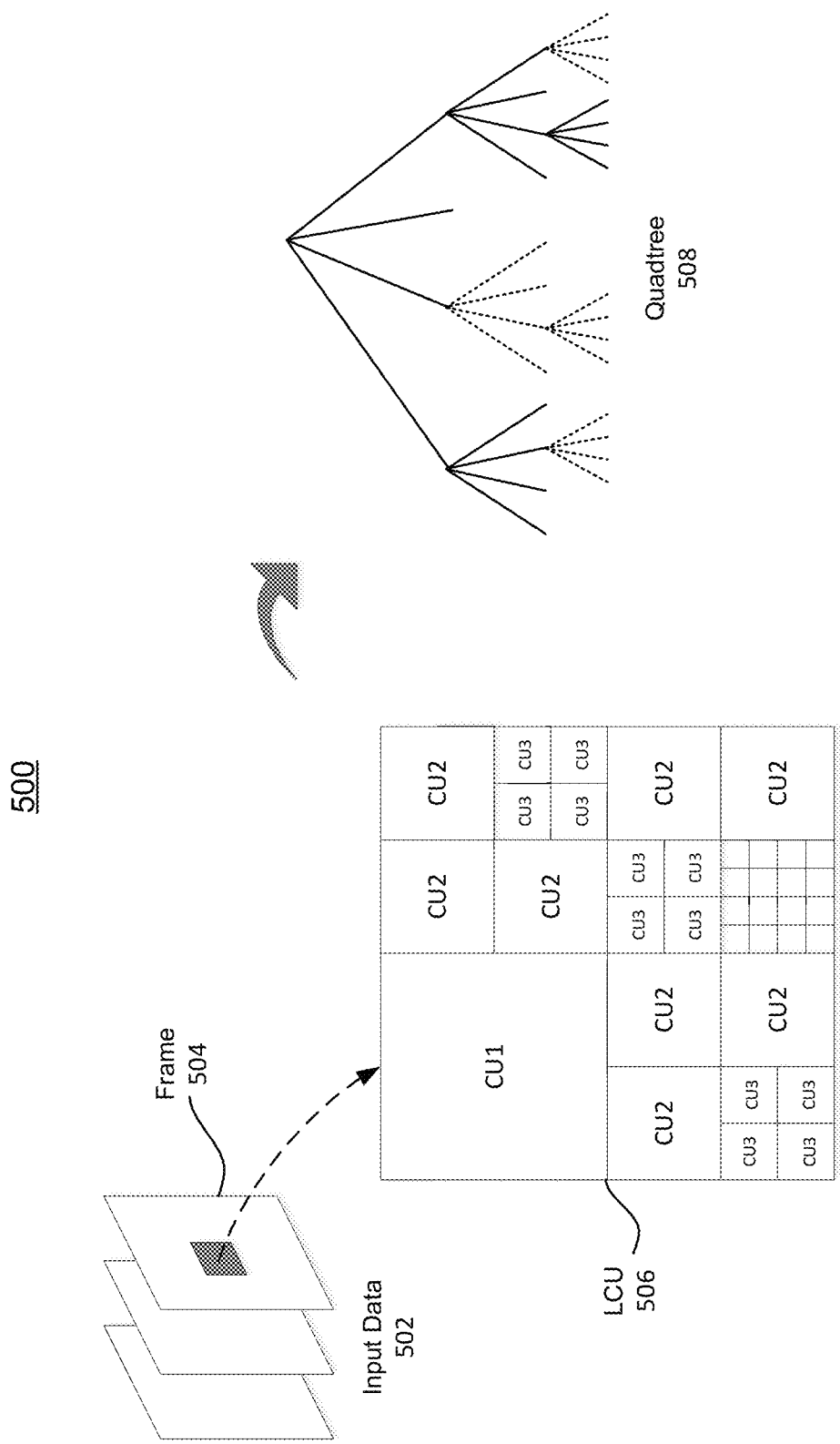
FIG. 5 illustrates exemplary hierarchical data units to be encoded, in accordance with various embodiments of the present disclosure.

FIG. 5 illustrates exemplary hierarchical data units to be encoded, in accordance with various embodiments of the present disclosure. As illustrated, an input data 502 can comprise a plurality of frames 504, which may represent consecutive image frames in a video stream. For example, in an exemplary system 500 supporting HEVC, each frame 504 may comprise one or more coding tree units (CTUs) or largest coding units (LCUs) 506, which may be represented using a quadtree 508 in a hierarchical fashion. As illustrated, each LCU 506 may comprise one or more coding units (CU)s. Each CU may comprise one or more blocks. Each block may comprise one or more pixels. Each pixel may comprise one or more sets of data corresponding to one or more data components such as luminance data component and chrominance data component.

In various embodiments, the encoding steps discussed herein can be applied to any suitable data level or levels. Applying an encoding step at a certain data level may indicate that an entire (or a portion of a) data unit at the given data level may be encoded before the encoding step is applied to the next data unit. The encoding steps may be applied at the same data level. For instance, using the H.264 standard, the transformation step and/or quantization step can be applied at a block level (e.g., to 8×8 pixel blocks), a macroblock level (e.g., to 16×16 pixel macroblocks), or at a slice level. Alternatively, different encoding steps may be performed at different data levels. For instance, the transformation step may be performed at the macroblock level, the quantization step may be performed at the slice level, and the entropy encoding step may be performed at the frame level. In one example, all the macroblocks within a given slice may be transformed one by one before the entire transformed slice is quantized, and all the slices within a frame may be quantized before the quantized coefficients are entropy encoded.

Similarly, the rate control parameters may be applicable to any suitable data level or levels. For example, a single quantization parameter may be used for the quantization of a block, a macroblock, or a slice. In some embodiments, different rate control parameters may be associated with different encoding operations, which may be applied to different data levels. For example, a motion detection threshold may be used for motion detection of macroblocks, a quantization parameter may be used for quantization of slices, and another rate control parameter may be used during entropy encoding of an entire frame.

In accordance with various embodiments of the present disclosure, various rate control methods can improve coding efficiency by incorporating a rate distortion optimization (RDO) process for determining optimized coding parameters and bit allocation. In one example using the H.264 standard, a rate model may be used to predict the number of bits output after a macroblock or frame is coded with a specific QP; and a distortion model may be used to predict the distortion associated with each QP. Combined, the rate model and the distortion model can be used to determine an optimal value for the quantization parameter (QP) for each macroblock or frame, e.g. based on a measure of the variance of the residual signal (i.e. the prediction difference signal) and a specific target bit allocation. For example, the best QP may be chosen using the Lagrangian optimization techniques.

Different rate control models may be employed for controlling the coding rate without limitation. In one example, the rate-distortion optimization (RDO) process may use a rate-quantization (R-QP) model, e.g. based on the following quadratic rate-distortion (R-D) model.

$$R = \frac{a}{QP} + \frac{b}{QP^2}$$

Potential interdependence may exist between the RDO process and the QP determination process for rate control. On one hand, the residual information may be used to determine an appropriate QP in order to achieve certain coding bit rate. On the other hand, the residual information may only be determined after the RDO process is completed, which requires a predetermined QP.

One solution to avoid such a "chicken or the egg" dilemma is using a linear model to predict the complexity of the data unit (e.g. frame, slice, macroblock in H.264 standard) to be encoded based on the residual signal of previously encoded (and co-located) units, which allows the QP to be selected prior to the coding (e.g. prior to the coding mode decision). For example, the residual (e.g. the texture or prediction error) can be measured using sum absolute distortion (SAD) or mean absolute distortion (MAD), which assumes that the complexity varies gradually from picture to picture. However, for a non-stationary video (e.g. when a scene change occurs), the video quality may degrade sharply, since information collected from previous frames is no longer useful or relevant and the linear model may fail to predict a correct MAD. Furthermore, inaccurate MAD may cause the QP miscalculation (and frame window size miscalculation), which may result in poor RDO performance.

In another example, the rate-distortion optimization (RDO) process may employ an R-λ model. Using the R-λ model, the determination of a Lagrangian multiplier, λ, is independent from the RDO process, which helps to solve the "chicken or the egg" dilemma as described in the above. However, because λ is a continuous variable, and QP is a discrete variable, there is no straight forward one-to-one correspondence relationship. This may cause the bit rate to fluctuate rather than converge when λ is iterated at the boundary (or gap) of the QP values, as the coding progresses. As a solution, a complex algorithm may be used for dealing with the bit rate fluctuation in coding. This may contribute to extra overhead and may become infeasible in various hardware implementations.

In accordance with various embodiments of the present disclosure, a logarithm R-QP model can be used for rate control to avoid coding fluctuation. For example, the following logarithm R-QP model can be employed.

$$\ln(bpp) = \alpha \cdot QP + \beta$$

In the above logarithm model, $\alpha$ and $\beta$ are parameters related to the video content. Also, the rate R can be represented using the bits per pixel (bpp), which may be calculated using the following formula, $$bpp = \frac{R}{f \cdot w \cdot h}$$

where f represents the frequency of the video frame series, and w and h represents the width and height of the video frame. In various embodiments, the use of bits per pixel (bpp) allows the rate control model to account for flexible unit and/or variable block size (e.g. for coding units in the HEVC standard).

Figure 6:
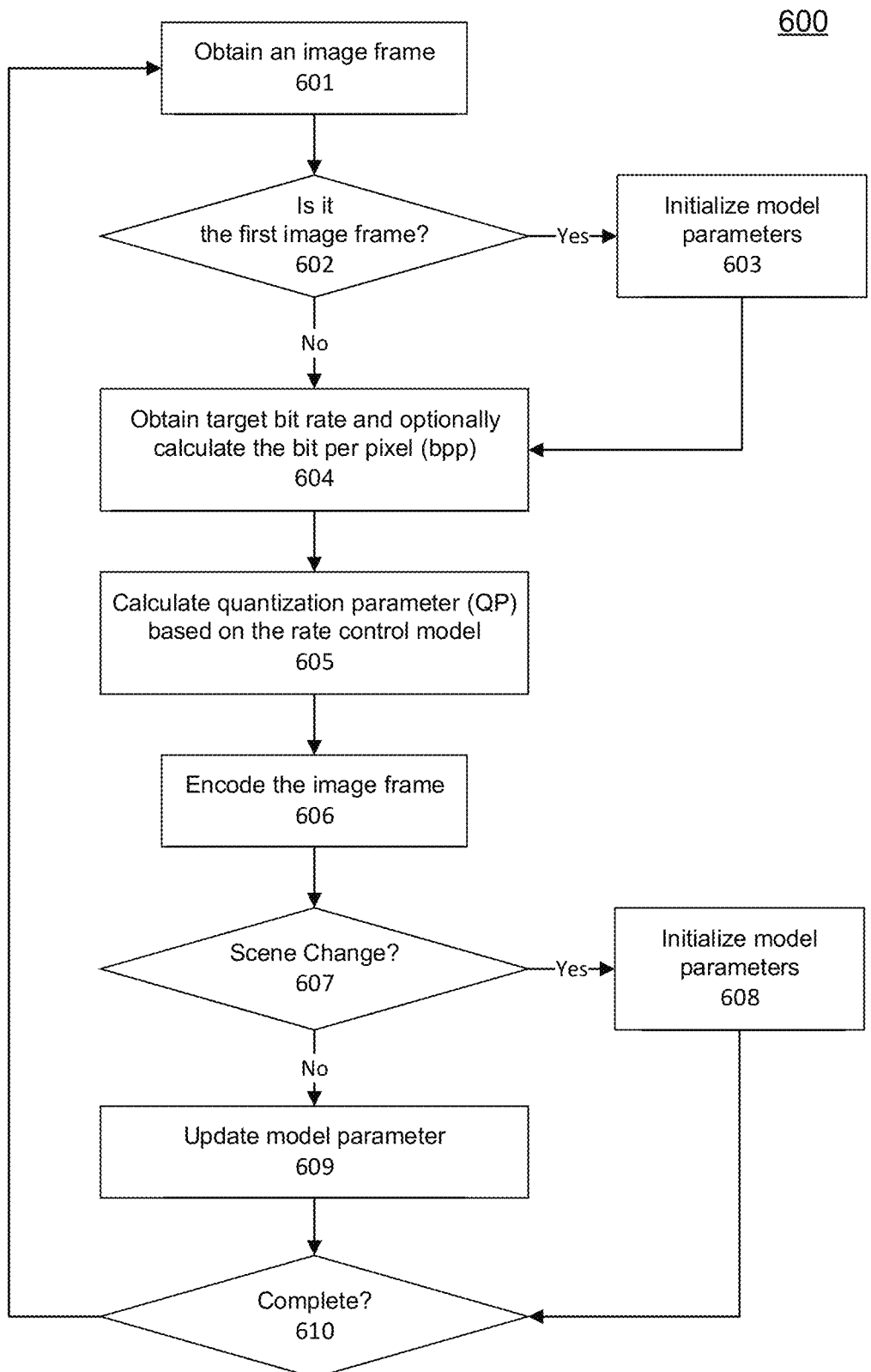
FIG. 6 illustrates exemplary rate control model at frame level, in accordance with various embodiments of the present disclosure.

FIG. 6 illustrates exemplary rate control scheme at frame level, in accordance with various embodiments of the present disclosure. As illustrated in FIG. 6, at the step 601, the encoder 600 can obtain an image frame from a video stream. The obtained image frame may be an intra frame or an inter frame. Different approaches may be used for coding the different types of image frames. For example, in H.264, the bit rate control model for each image frame can be updated iteratively on a frame-by-frame basis. Due to the difference in the number of bits coded for different types of frames (such as I frames and P frames), the encoder 600 may only apply rate control and update model for the same type of coding frames. For example, for the Low-Delay P frame structure (IPPPPPP . . . ) or the Period-I frame structure (IPPP . . . IPPP . . . ), the model update may be performed for the P frames only. On the other hand, the rate control models for the I-frames may not be updated, even though the rate control model may be used to predict QP for the I-frames.

Furthermore, the encoder 600 can initialize various model parameters if needed. For instance, at the step 602, the encoder 600 can determine whether the obtained image frame is the first image frame in the video series. If the obtained image frame is the first image frame in the video series, then the encoder 600 can initialize the model parameters at the step 603. For the above logarithm model, the parameters, $\alpha$ and $\beta$, can be initialized with initial values $\alpha_0$ and $\beta_0$. Otherwise, the encoder 600 can take advantage of an existing rate control model that may be (or not be) updated following the coding of a previous image frame.

As illustrated in FIG. 6, at the step 604, the encoder 600 can obtain target bit rate (R) at frame level for the obtained image frame. Optionally, the encoder 600 can calculate the bits per pixel (bpp) for the obtained image frame based on the target bit rate. At the step 605, the encoder 600 can calculate the quantization parameter (QP) based on the rate control model. For example, the encoder 600 can predict the QP using the above logarithm model. Alternatively, the encoder 600 can predict the QP using other approaches, e.g. using the above quadratic model. Then, at the step 606, the encoder 600 can encode the image frame using the calculated QP.

Furthermore, the system can analyze the coding information and/or statistics for the coded data after the encoder 600 finishes coding the image frame. As illustrated in FIG. 6, at the step 607, the system can determine whether the scene has changed significantly based on analyzing the coded data. For example, the system can determine that the scene has changed significantly when an intra-predicting block ratio is above a threshold. The intra-predicting block ratio may be defined as a ratio (or percentage) based on the number of intra-predicting blocks in encoding an image frame. When the scene has changed significantly, it is likely that the encoding of a substantial number of image blocks may be performed based solely on information that is contained within the current image frame, since the information contained in the previous image frames may be drastically different when the scene changes significantly.

At the step 608, the system can initialize model parameters if there is a scene change. On the other hand, at the step 609, the system can update the rate control model parameter accordingly, when there is no significant scene change. Furthermore, at the step 610, the system can check whether the video is completed. If not, the system can obtain another image frame from the video for coding.

In accordance with various embodiments of the present disclosure, various techniques can be used for updating the rate control model parameter while preventing fluctuation in video coding, which may occur even when the scene has not change drastically. For example, the system can update the rate control model parameters, $\alpha$ and $\beta$, using the following formulas.

$$\alpha_{new} = \alpha_{old} + \Delta\alpha$$

$$\beta_{new} = \beta_{old} + \Delta\beta$$

In various embodiments, the system can dynamically control the update of the rate control model parameters, $\alpha$ and $\beta$, by taking advantage of a learning rate, $\mu$. For example, using the logarithm model, model parameters, $\alpha$ and $\beta$, may be updated using the following formulas as the coding progresses, based on a random gradient decent algorithm.

$$\alpha_{new} = \alpha_{old} \mu \cdot QP \cdot (\ln(bpp) - (\alpha_{old} \cdot QP + \beta_{old}))$$

$$\beta_{new} = \beta_{old} \mu \cdot (\ln(bpp) - (\alpha_{old} \cdot QP + \beta_{old}))$$

In various embodiments, the learning rate, $\mu$, may be pre-configured or pre-determined. Alternatively, the learning rate, $\mu$, may be determined dynamically as the coding progresses. For example the learning rate, $\mu$, may be determined as $$\frac{1}{QP^2 + 1},$$

which corresponds to an optimized rate control model.

Alternatively, a sliding window can be used for preventing the coding fluctuation. In various embodiments, a sliding window can smooth out the fluctuation in coding/compressing based on the historic coding information.

Figure 7:
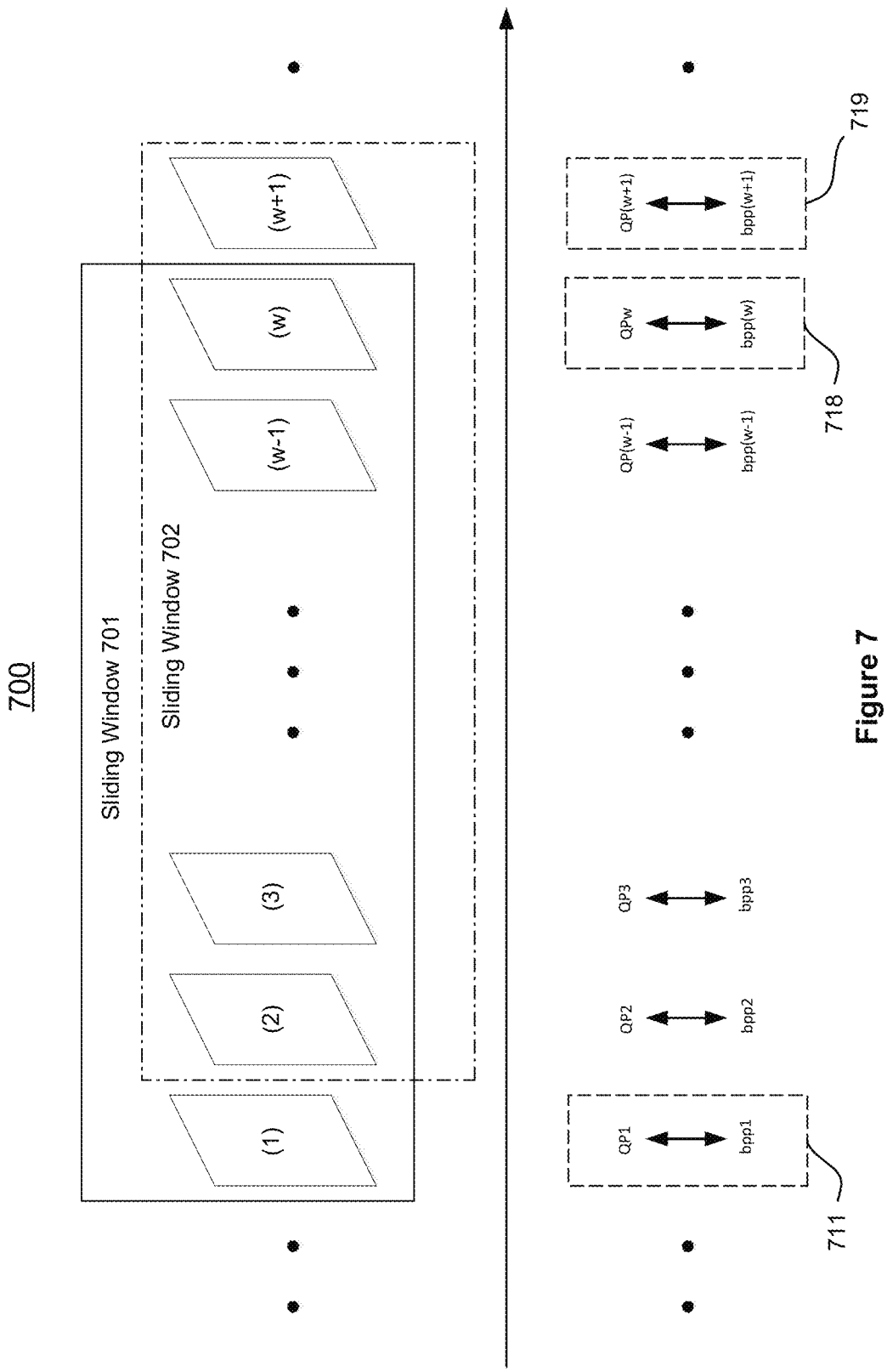
FIG. 7 shows an exemplary illustration of using a sliding window for preventing coding fluctuation, in accordance with various embodiments of the present disclosure.

FIG. 7 shows an exemplary illustration 700 of using a sliding window for preventing coding fluctuation, in accordance with various embodiments of the present disclosure. As illustrated, a sliding window 701, which may be used for determining the optimized model parameters, can comprise a plurality of image frames. Each of the image frame in the sliding window 701 may correspond to one or more sample points 711-718. As the coding progresses, a sliding window 702 may be used instead of the sliding window 701 for updating the model parameters. The sliding window 702 may comprise one or more new image frames, which corresponds to one or more new sample points (e.g. the sample point 719), while one or more old image frames, which corresponds to one or more old sample points (e.g. the sample point 711), may be removed from the sliding window 702.

For example, using the above logarithm R-QP model, each image frame i in the sliding window 701 may correspond to a sample point $((QP_i, \ln(bpp_i)), i \in [1, w])$, assuming that the window size is w. As the coding progresses, a different sliding window 702 may be used. Each image frame i in the sliding window 702 may correspond to a sample point $((QP_i, \ln(bpp_i)), i \in [2, w+1])$.

Assuming that the resultant number of sample points is N, the system can determine the model parameters, $\alpha$ and $\beta$, by minimizing the following cost function.

$$J(\alpha,\beta) = \frac{1}{2} \sum_{i=1}^{N} (\ln(bpp_i) - (\alpha \cdot QP_i + \beta))^2$$

In various embodiments, an optimized solution can be found based on various techniques. For example, by letting $$\frac{\partial J(\alpha, \beta)}{\partial \alpha} = 0, \frac{\partial J(\alpha, \beta)}{\partial \beta} = 0,$$

the least squares solution can be obtained as shown in the following.

$$\begin{bmatrix} \sum_{i=1}^{N} QP_i^2 & \sum_{i=1}^{N} QP_i \\ \sum_{i=1}^{N} QP_i & N \end{bmatrix} \begin{bmatrix} \alpha \\ \beta \end{bmatrix} = \begin{bmatrix} \sum_{i=1}^{N} QP_i \cdot \ln(bpp_i) \\ \sum_{i=1}^{N} \ln(bpp_i) \end{bmatrix}$$

Thus, when $N \cdot \sum_{i=1}^{N} QP_i^2 - (\sum_{i=1}^{N} QP_i)^2 \neq 0$, the model parameters, $\alpha$ and $\beta$, may be updated using the following formulas as the coding progresses.

$$\alpha = \frac{N \cdot \sum_{i=1}^{N} QP_i \cdot \ln(bpp_i) - \sum_{i=1}^{N} \ln(bpp_i) \cdot \sum_{i=1}^{N} QP_i}{N \cdot \sum_{i=1}^{N} QP_i^2 - \left(\sum_{i=1}^{N} QP_i\right)^2}$$

$$\beta = \frac{\sum_{i=1}^{N} \ln(bpp_i) \cdot \sum_{i=1}^{N} QP_i^2 - \sum_{i=1}^{N} QP_i \cdot \ln(bpp_i) \cdot \sum_{i=1}^{N} QP_i}{N \cdot \sum_{i=1}^{N} QP_i^2 - \left(\sum_{i=1}^{N} QP_i\right)^2}$$

The above condition holds true when there are more than two distinct sample points existing in the sliding window, (i.e. N>2). In various embodiments, the sample points in a sliding window can be pre-processed, so that each sample point in the sliding window may be associated with a distinctive QP. For example, the system can calculate an average of different values of $\ln (\overline{bpp_k})$ for each distinctive $QP_k$. Thus, multiple sample points associated with a same QP but with different values of $\ln (\overline{bpp_k})$ can be combined into one sample point (i.e., no two sample points having different bits per pixel (bpp) values may be associated with the same QP).

On the other hand, in the cases when there are no more than two distinct sample points existing in the sliding window (i.e. N<=2), the model parameters, $\alpha$ and $\beta$, may be updated based on the random gradient decent algorithm as the coding progresses.

Figure 8:
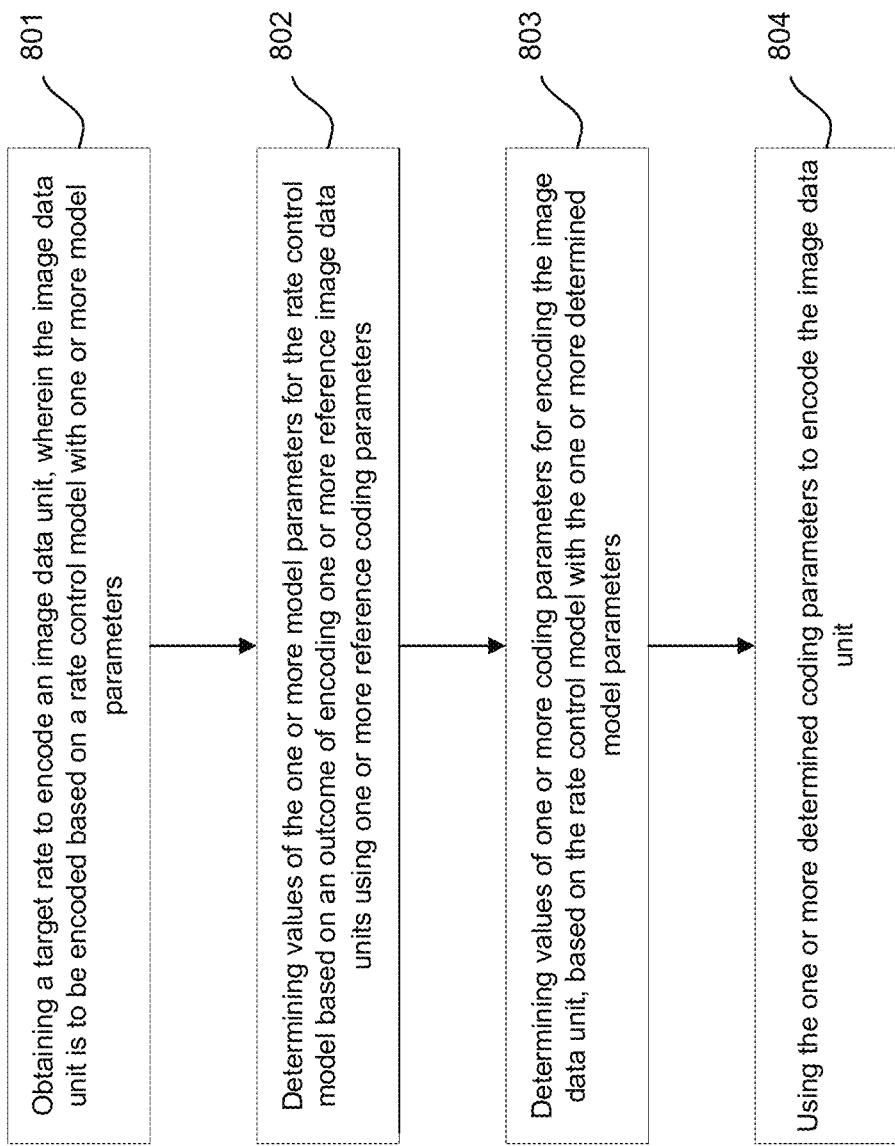
FIG. 8 illustrates a flow chat for controlling video encoding at frame level, in accordance with various embodiments of the present disclosure.

FIG. 8 illustrates a flow chat for controlling video encoding at frame level, in accordance with various embodiments of the present disclosure. As shown in FIG. 8, at step 801, a video encoder can obtain a target rate to encode an image data unit such as an image frame, wherein the image data unit is to be encoded based on a rate control model with one or more model parameters. At step 802, the video encoder can determine values of the one or more model parameters for the rate control model based on an outcome of encoding one or more reference image data units using one or more reference coding parameters. Then, at step 803, the video encoder can determine values of one or more coding parameters for encoding the image data unit, based on the rate control model with the one or more determined model parameters. At step 804, the video encoder can use the one or more determined coding parameters to encode the image data unit.

In accordance with various embodiments of the present disclosure, various rate control techniques may be performed within image frame at the basic unit level to improve the precision of rate control, e.g. for achieving constant bit rate (CBR) control.

Figure 9:
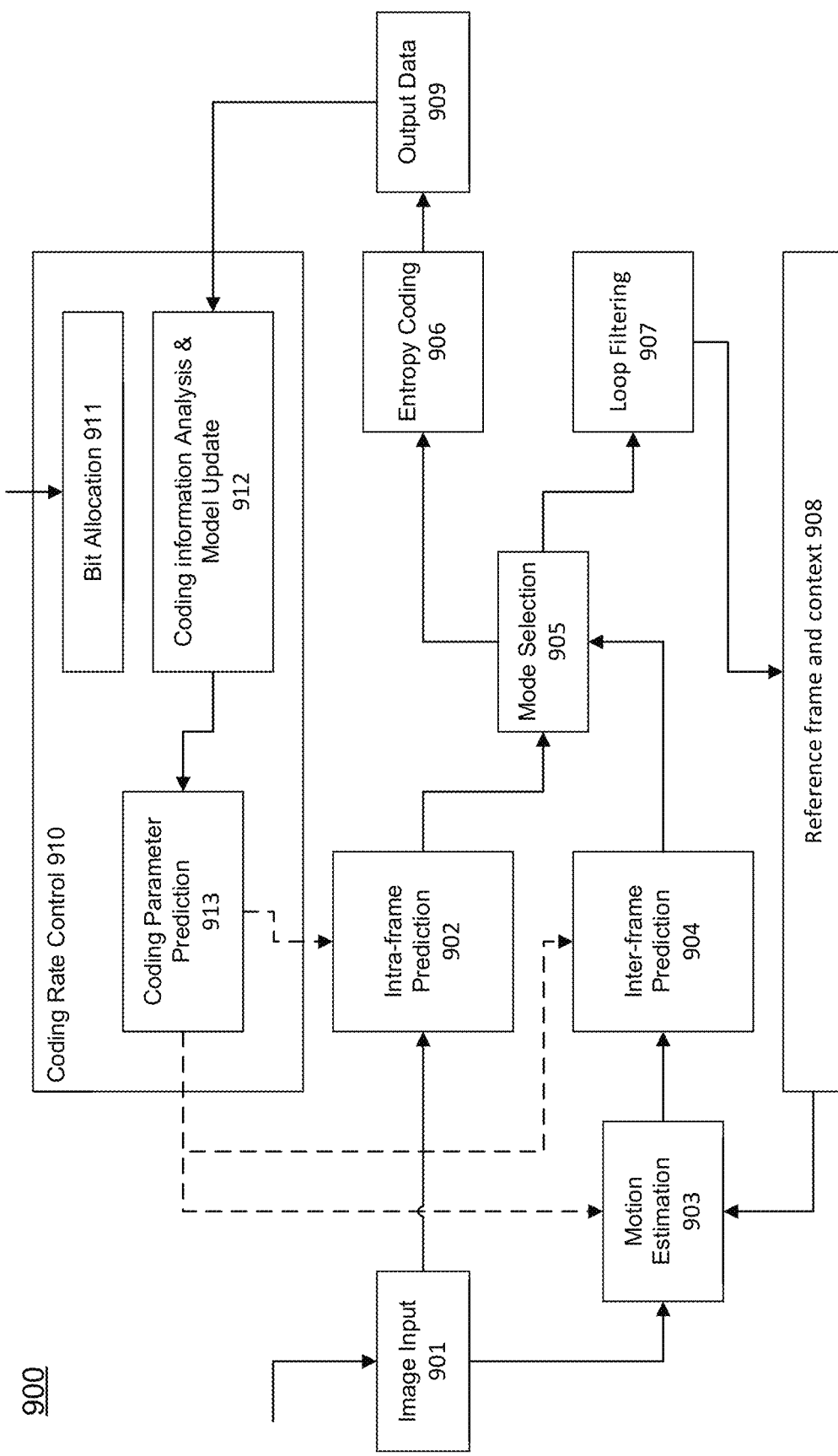
FIG. 9 illustrates an exemplary encoder with rate control, in accordance with various embodiments of the present disclosure.

FIG. 9 illustrates an exemplary encoder with rate control, in accordance with various embodiments of the present disclosure. As illustrated in FIG. 9, an encoder 900 can encode input data, such as an image input 901 that can be split into multiple image blocks for coding. The encoding can be based on intra-frame prediction 902 and inter-frame prediction 904. The intra-frame prediction 902 may be performed based solely on information that is contained within the current frame, independent of other frames in the video sequence. Inter-frame prediction 904 can be performed by eliminating redundancy in the current frame based on a reference frame, e.g. a previously processed frame. For example, the inter-frame prediction 904 can be based on motion estimation 903. The inter-frame prediction 904 can involve choosing motion data comprising the selected reference picture and motion vector (MV) to be applied for predicting the samples of each image blocks.

There may be different available modes for coding an image block. For example, in H.264, the available coding modes for a macroblock in an I-slice include: intra 4×4 prediction and intra 16×16 prediction for luma samples, and intra 8×8 for chroma samples. In HEVC, the number of coding modes are substantially increased along with the increased number of sizes of the CUs. The system can perform the mode selection 905 to select the optimal coding mode for encoding the image block. Then, using the selected mode, the encoder 900 can perform entropy coding 906, which can generate the output data 909.

Additionally, the encoder 900 can perform a loop filtering 907, in order to reduce or suppress the blocking artifacts, e.g. in the reference frames. For example, in HEVC, the system can take advantage of a pair of filters, which includes a de-blocking filter (DBF) and a sample adaptive offset filter (SAO). After removing the blocking artifacts, the output from the in-loop filter can be stored in the reference frame and context 908 and can be used in the encoding of the next blocks, e.g. for motion estimation 903.

As illustrated in FIG. 9, a coding rate control module 910 may be responsible for bit allocation 911, coding information analysis and model update 912, and coding parameter prediction 913. For example, in H.264, the implementation of the macroblock rate control scheme can comprise several processes: macroblock target bit pre-allocation, macroblock group target bit adjustment, macroblock group coding QP prediction, entropy coding information (statistics) collection and macroblock model parameter updates.

Figure 10:
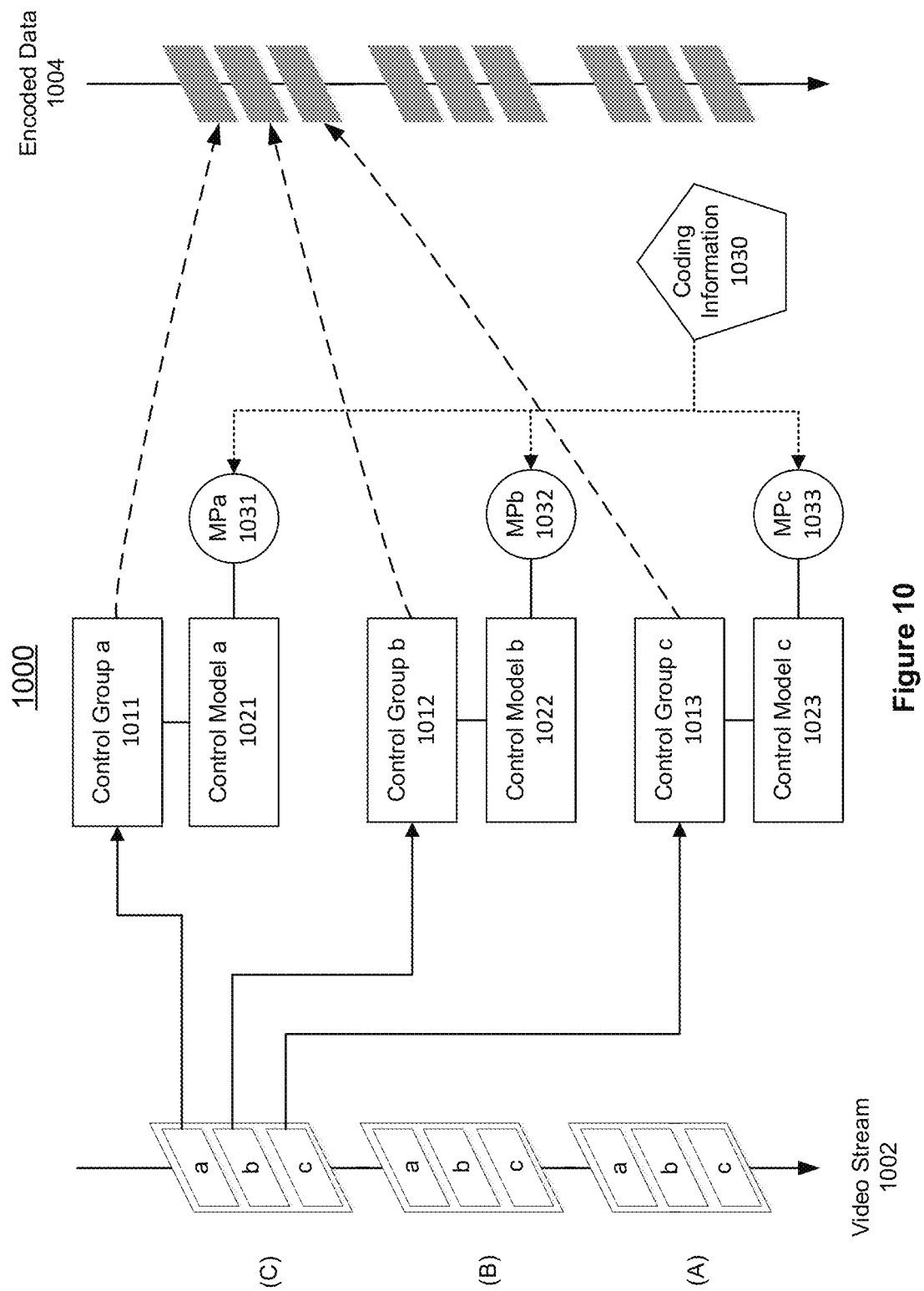
FIG. 10 illustrates rate control for different control groups at basic unit level, in accordance with various embodiments of the present disclosure.

FIG. 10 illustrates rate control for different control groups at basic unit level, in accordance with various embodiments of the present disclosure. As illustrated, a video encoder 1000 can be used for encoding a video stream 1002 into encoded data 1004. The input video stream 1002 may include a plurality of images frames, such as images frames A-C. Each image frame A-C can be partitioned into different coding block groups, such as different control groups of basic units (e.g. control groups a-c).

As shown in FIG. 10, each control group a-c may be associated with a separate control model. Additionally, corresponding control groups of basic units in different image frames may share the same control model. For example, the control group a 1011 in each of the image frames A-C may be associated with a control model 1021 with one or more model parameters 1031; the control group b 1012 in each of the image frames A-C may be associated with a control model 1022 with one or more model parameters 1032; and the control group c 1013 in each of the image frames A-C may be associated with a control model 1031 with one or more model parameters 1033.

In accordance with various embodiments, the granularity of rate control at the basic unit level depends on the selection of the coding block groups (or control groups). For example, in H.264, a basic unit for coding may be a macroblock, and a control group of basic units may be chosen as a group of macroblocks, such as a slice, a tile, or a row of macroblocks. Alternatively, in HEVC, a basic unit can be a coding tree unit (CTU), and a control group of basic units may be chosen as a group of CTUs. In HEVC, a CTU, also referred to as a largest coding unit (LCU), may be further divided into one or more coding tree blocks (CTBs) and coding units (CUs).

In accordance with various embodiments of the present disclosure, various methods can be employed for rate control at the basic unit level. For example, a rate control scheme in the reference software for the HEVC standard can be implemented based on the largest coding unit (LCU). The bit allocation step can be performed for calculating the weight based on an R-$\lambda$ control model for each LCU (e.g., in the size of 64×64 pixels). Then, the system can adjust the bit allocation based on the outcome (or error) of coded LCU and calculate the QP for the next LCU. However, overhead, such as the hardware storage and computational overhead, for the R-$\lambda$ based rate control scheme can be significant due to the fine control granularity. Also, the R-$\lambda$ based rate control scheme may require complex algorithms to deal with the intensive processing and the frequent outliers. Furthermore, the LCU level may not be easily achieved due to the existence of pipeline delay in feeding back coding statistics.

In accordance with various embodiments of the present disclosure, a rate control scheme based on a logarithmic R-QP model can achieve precise control of the video coding with efficiency. Even when the source content changes drastically, the bit rate control algorithm can achieve the efficient use of channel bandwidth, while reducing the frame-level delay during the transmission process.

Figure 11:
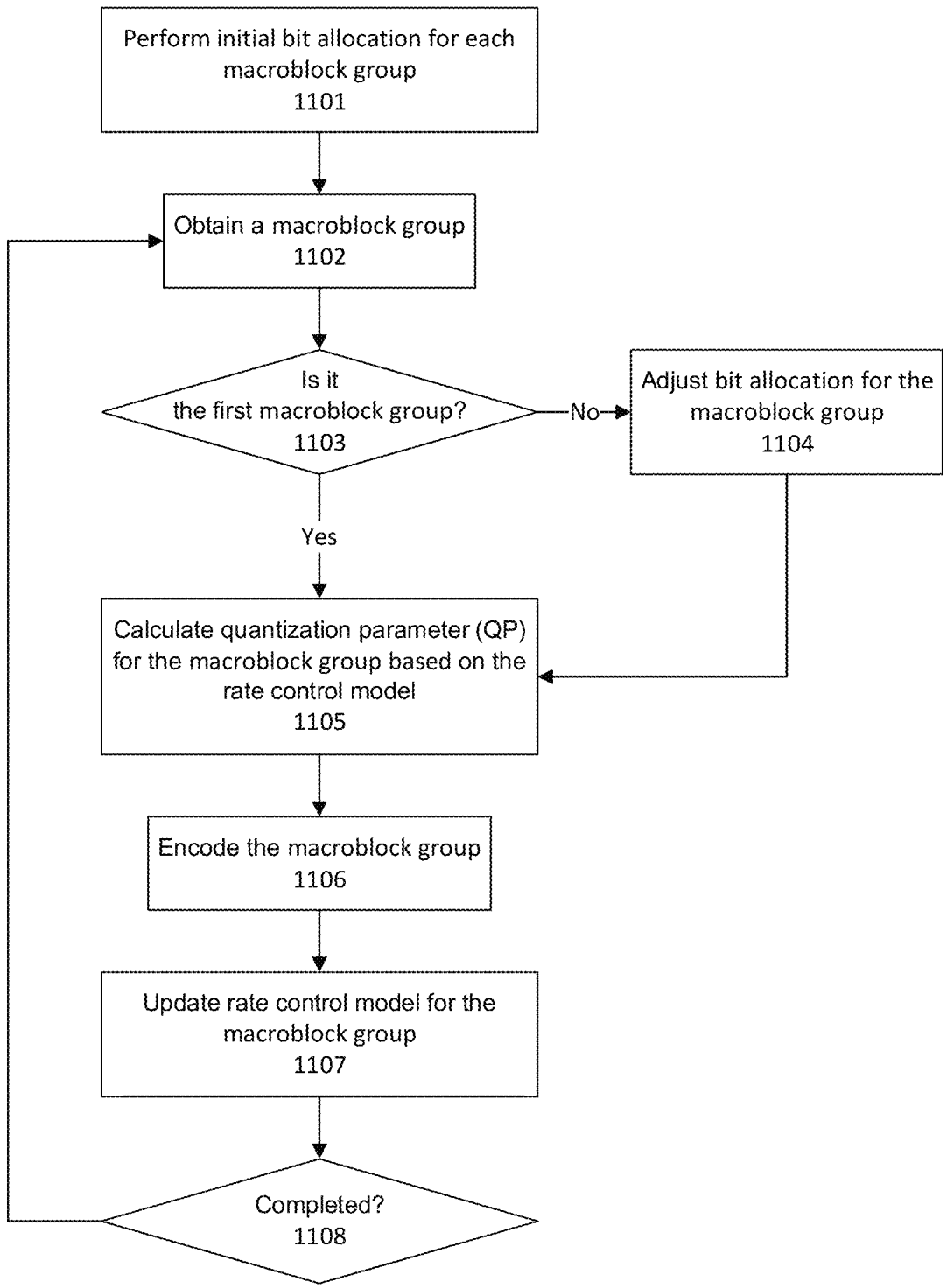
FIG. 11 illustrates an exemplary rate control scheme at basic unit level, in accordance with various embodiments of the present disclosure.

FIG. 11 illustrates an exemplary rate control scheme 1100 at basic unit level, in accordance with various embodiments of the present disclosure. As illustrated, at the step 1101, an encoder 1100 can perform initial bit allocation for each control group of the basic units. For example, in H.264, the control group can be a macroblock group (e.g. a row of macroblocks). Prior to the coding of each image frame, the encoder 1100 can perform initial bit allocation for each macroblock group in the image frame according to the corresponding control model associated with each macroblock group.

In various embodiments, the initial bit allocation can be performed at frame level based on the frame rate control model and the target bit rate for the frame to be encoded. The encoder 1100 can determine coding parameters (e.g. QPs) at frame level for the frame to be coded. Then, the encoder 1100 can use the predicted frame level coding QP, with the corresponding control model for each macroblock group, to predict the coding rate such as the coding bits per pixel (bpp) for each macroblock group. Furthermore, the target coded bits of the encoded frame may be pre-allocated for each macroblock group based on the predicted bit rate of each macroblock, which may be used as an indicator for the complexity in each macroblock.

For example, the bit allocation for each macroblock row can be performed using the following formula, $$T_i = \text{Target\_bits} \cdot \frac{bpp_i}{\sum_{i=1}^{N} bpp_i}$$

where N is the number of macroblocks in the image frame, $T_i$ is the number of target bits pre-allocated for the i-th macroblock row, and Target_bits represent the target coded bits for the entire frame.

At the step 1102, the encoder 1100 can obtain a control group of basic units, such as a row of macroblocks in a buffer, and determine whether the bit allocation for the control group needs to be adjusted. For example, at the step 1103, the encoder 1100 can determine whether the obtained control group is the first control group for coding in an image frame. If the acquired group is the first group, the system can proceed to encode the group. At the step 1104, if the obtained control group is not the first group in an image frame (i.e. a portion of the target coded bits for the image frame has been coded or consumed), the encoder 1100 can adjust the bit allocation for the obtained group based on the coding result of the one or more earlier groups.

In various embodiments, after encoding a macroblock row, the encoder 1100 can determine a deviation between the number of bits actually consumed for encoding the macroblocks in the image frame and the number of the pre-allocated target number of bits. It is beneficial to make a compensation or adjustment to the number of pre-allocated bits for the next macroblock row to be encoded according to the deviation. In various embodiments, a sliding window can be used for avoiding coding fluctuation. For example, the adjustment can be calculated as follows, $$R_i = T_i + \frac{\text{Acc\_delta\_bits}}{SW}$$

where SW is the window size, $R_i$ is the number of target bits with compensation for the i-th macroblock row, $T_i$ is the number of target bits pre-allocated for the i-th macroblock row. Additionally, Acc_delta_bits is the cumulative coding error for the coded i-1 macroblock rows of the current frame (i.e. the difference between the number of pre-allocated target bits and the actual number of bits consumed).

At the step 1105, the encoder 1100 can calculate quantization parameter (QP) for the control group based on the adjusted target bit using the rate control model. For example, the system can calculate the predicted $QP_i$ for the i-th macroblock row based on the target $bpp_i$, which is calculated according to the adjusted bit rate, $R_i$. In various embodiments, the coding QPs for the adjacent macroblocks may not vary drastically to ensure satisfactory visual quality. For example, it may be beneficial to apply the following constraint on the $QP_i$ according to the $QP_{i-1}$ for the adjacent macroblock row.

$$QP_{i-1} - 1 \leq QP_i \leq QP_{i-1} + 1$$

In various embodiments, the encoder 1100 can further adjust the target bit rates pre-allocated to each control group based on the complexity. The encoder 1100 can make coding parameters adjustment according to the pre-allocated bit rate to determine whether an image block is a flat area or a complex area, in order to adjust the coding parameters to improve the coding efficiency and quality. For example, in the case of low bit rate, the system can adjust the coding parameters in order to focus on the most sensitive areas in an image frame. In various embodiments, the system can determine that a macroblock group corresponds to a flat area with less texture, when the pre-allocated bit rates is less than a threshold. Also, the encoder 1100 can determine that a macroblock group corresponds to a complex area with more texture, when the pre-allocated bit rates is higher than the same or a different threshold. These thresholds may be determined according to the average bit rate, e.g. a ratio to the average bit rate. Then, the QP for coding a particular macroblock group can be adjusted, e.g. by adding or subtracting a predetermined value, ΔQP. Additionally, in order to increase the visual quality of the coded image, the flat areas in an image frame may be categorized into multiple levels, distinguished by different thresholds and coded with different QPs. Similarly, the complex areas in an image frame may also be categorized into multiple levels, distinguished by different thresholds and encoded using different QPs. Thus, the system can ensure the fluency in data transmission, especially in various low coding rate scenarios, by reducing the resource allocated to visually insensitive areas.

Additionally, the bit rate control model for each macroblock group can be updated iteratively on a frame-by-frame basis. Due to the difference in the number of bits for coding different types of frames (such as the I and P frames), the system may apply macroblock group rate control and model update only on the same type of coding frames. For example, for the Low-Delay P frame structure (IPPPPPP . . . ) or the Period-I (IPPP . . . IPPP . . . ) frame structure, the model update may be performed on the P frame only. For the I-frames, the rate control model is not updated (even though the rate control model may be used to predict QP for the I-frames).

At the step 1106, the encoder 1100 can encode the obtained control group of basic units using the calculated QP. Furthermore, at the step 1107, the encoder 1100 can update the rate control model parameters for the macroblock group, e.g. based on the coding information and/or the entropy coding statistics. Referring back to FIG. 10, the encoding of the frame C can be based on the historic coding information 1030 from the image frames A and B. For example, in H.264, the system can be responsible for counting the number of bits consumed after the coding of each macroblock (group) and obtaining the error statistics after the last macroblock of each row is coded. Thus, the model parameters of the macroblock row may be updated based on the QP used for encoding the macroblock row in the image frame and the error statistics collected from analyzing the outcome of the encoding process. Then, the updated model can be used as the bit rate control model for the control group at the same location in the next frame, e.g. participating at least in the bit pre-allocation and QP prediction process for the next frame.

At the step 1108, the encoder 1100 can determine whether a particular image frame is completed. If not, the system can obtain another control group for coding until it finishes coding the image frame. Thus, using the above rate control scheme, the system can achieve accurate video coding rate control. An input image frame can be encoded in one pass with coding rate matching substantially with the target bit rate. Also, the system can make full use of channel bandwidth and reduce the transmission delay. In the process of encoding each image frame, the system can adjust the coding parameters for each control group of basic units, such as for each macroblock group. Thus, the system can make the appropriate adjustment to ensure a smooth code rate, even when the source of content changes drastically.

In accordance with various embodiments of the present disclosure, rate control at the basic unit level may be implemented using hardware implementation to achieve efficiency. Hardware implementation may need to consider various types of overheads. For example, the selection of the control group can be determined according to the control precision requirements and implementation cost.

Figure 12:
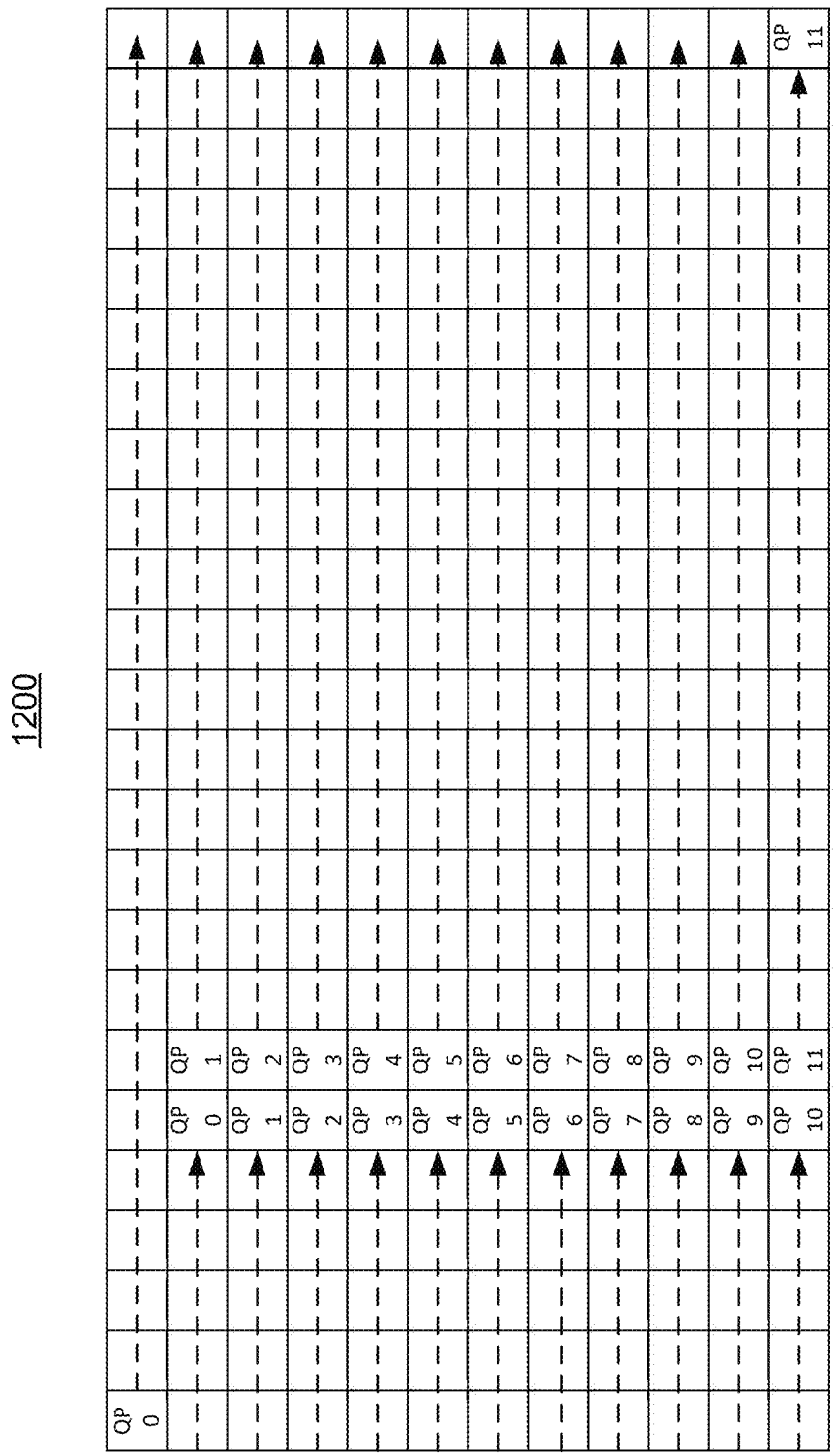
FIG. 12 illustrates an exemplary hardware implementation of the rate control scheme, in accordance with various embodiments of the present disclosure.

FIG. 12 illustrates an exemplary hardware implementation of the rate control scheme, in accordance with various embodiments of the present disclosure. As shown in FIG. 12, a hardware implementation of the system 1200 may process multiple coding block groups such as control groups of basic units, e.g. twelve (12) macroblock rows, in a sequential fashion (i.e. using a pipeline).

The system 1200 may start processing the first macroblock row in the image frame using a first QP value, QP0. As soon as the system finishes processing the first macroblock row, the system 1200 may start process the second macroblock row without delay. Due to the time required for analyzing the coding statistics for the first macroblock row, the updated coding parameter, e.g. QP1, may not be available immediately. In order to avoid interrupting the coding process, the system 1200 can delay the update of the coding parameter, QP1, while continuingly processing the second macroblock row using the old coding parameter, QP0. As a result, the updating of the coding parameter may not occur at the beginning of the processing of the second macroblock row (i.e. with an offset).

In various embodiments, the offset can be predetermined based on the time required by the hardware implementation for analyzing the coding statistics of a macroblock row. In the example as shown in FIG. 12, the offset can be set to six (6), which indicates that the updated QP1, may be applied to the second macroblock row except for the first six macroblocks, while QP0 can be used for encoding the first six macroblocks in the second macroblock row. As the encoding progresses, QP1 can be used for encoding the first six macroblocks in the third macroblock row, and an updated QP2, may be applied to the third macroblock row except for the first six macroblocks. In a similar fashion, the hardware implementation may be able to apply an updated coding parameter, e.g. $QP_i$, to process each following macroblock row (e.g., the i-th row) in the image frame with an initial offset. In the example as shown in FIG. 12, an old QP, e.g. $QP_{i-1}$, can be used for encoding the first six macroblocks in each following macroblock row.

Figure 13:
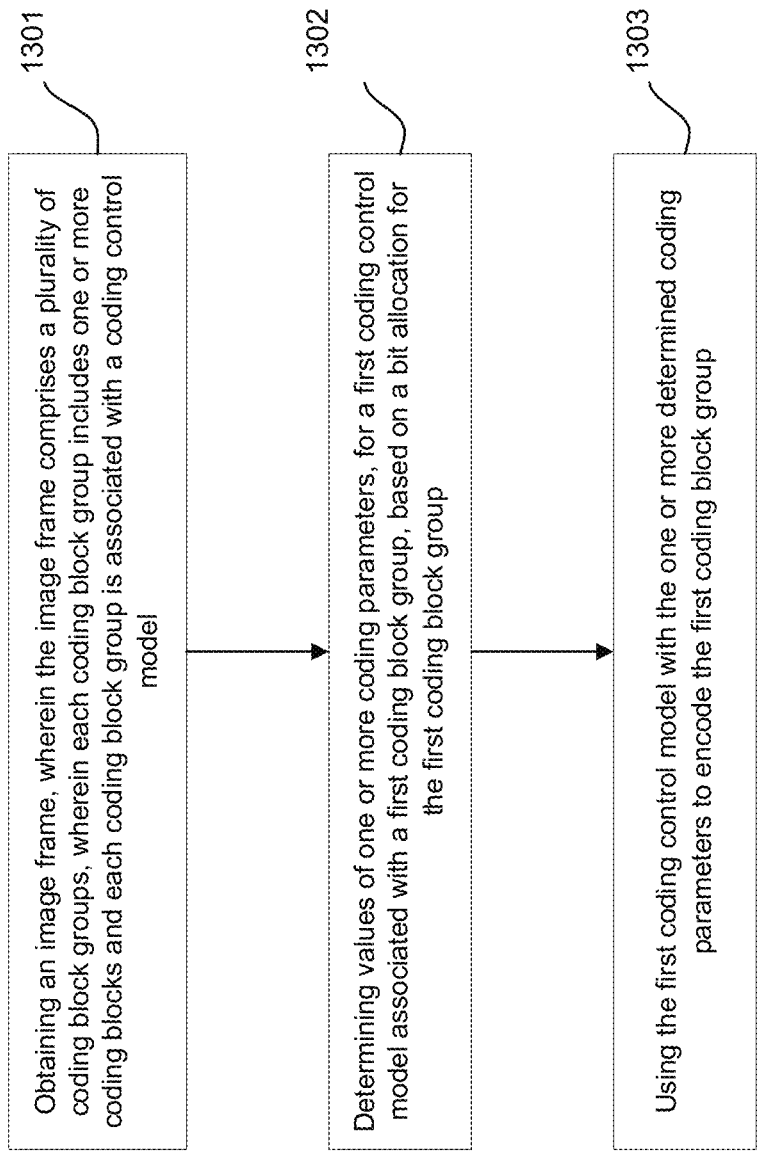
FIG. 13 illustrates a flow chat for controlling video encoding within image frame, in accordance with various embodiments of the present disclosure.

FIG. 13 illustrates a flow chat for controlling video encoding within image frame, in accordance with various embodiments of the present disclosure. As shown in FIG. 13, at step 1301, a video encoder can obtain an image frame, wherein the image frame comprises a plurality of coding block groups, wherein each coding block group includes one or more coding blocks and each coding block group is associated with a coding control model. Furthermore, at step 1302, the video encoder can determine values of one or more coding parameters, for a first coding control model associated with a first coding block group, based on a bit allocation for the first coding block group. Then, at step 1303, the video encoder can use the first coding control model with the one or more determined coding parameters to encode the first coding block group Many features of the present disclosure can be performed in, using, or with the assistance of hardware, software, firmware, or combinations thereof. Consequently, features of the present disclosure may be implemented using a processing system (e.g., including one or more processors). Exemplary processors can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like.

Features of the present disclosure can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems and execution environments/containers.

Features of the disclosure may also be implemented in hardware using, for example, hardware components such as application specific integrated circuits (ASICs) and field-programmable gate array (FPGA) devices. Implementation of the hardware state machine so as to perform the functions described herein will be apparent to persons skilled in the relevant art.

Additionally, the present disclosure may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

What is claimed is:

1. A method for controlling video coding, comprising:
   obtaining a target rate for an image data unit to be encoded using one or more coding parameters, wherein the one or more coding parameters are determined based on the target rate and a rate control model associated with one or more model parameters, the one or more coding parameters including a quantization parameter (QP);
   determining the one or more model parameters associated with the rate control model based on an encoding of one or more reference image data units using one or more reference coding parameters;
   determining the one or more coding parameters for encoding the image data unit based on the target rate and the rate control model associated with the one or more determined model parameters;
   using the one or more determined coding parameters to encode the image data unit;
   determining whether the image data unit contains a significant scene change, the image data unit being determined to contain the significant scene change in response to an intra-predicting block ratio in encoding the image data unit being above a threshold, the intra-predicting block ratio being defined as a ratio based on a number of intra-predicting blocks in encoding an image frame; and
   updating the one or more model parameters based on a gradient method with a learning rate, the learning rate being dynamically determined as reversely related to the QP.

2. The method of claim 1, further comprising determining the target rate based on a bit allocation or communication constraint.

3. The method of claim 1, wherein the target rate is a target bit rate or target bits per pixel (bpp).

4. The method of claim 1, wherein the image data unit is a group of pictures, an image frame, or a portion of an image frame.

5. The method of claim 1, further comprising configuring a sliding window with a sequence of reference image data units.

6. The method of claim 5, wherein at least two of the sequence of reference image data units are encoded using at least one identical coding parameter.

7. The method of claim 5, further comprising updating the one or more model parameters based on an optimization of the rate control model over multiple sample points within the sliding window, wherein each sample point corresponds to a reference image data unit of the sequence of reference image data units.

8. A video encoder, comprising:
   a memory storing one or more computer-executable instructions; and
   one or more processors configured to access the memory and execute the one or more computer-executable instructions to:
     obtain a target rate for an image data unit to be encoded using one or more coding parameters, wherein the one or more coding parameters are determined based on the target rate and a rate control model associated with one or more model parameters, the one or more coding parameters including a quantization parameter (QP);
     determine the one or more model parameters associated with the rate control model based on an encoding of one or more reference image data units using one or more reference coding parameters;
     determine the one or more coding parameters for encoding the image data unit based on the target rate and the rate control model associated with the one or more determined model parameters;
     use the one or more determined coding parameters to encode the image data unit;
     determine whether the image data unit contains a significant scene change, the image data unit being determined to contain the significant scene change in response to an intra-predicting block ratio in encoding the image data unit being above a threshold, the intra-predicting block ratio being defined as a ratio based on a number of intra-predicting blocks in encoding an image frame; and
     update the one or more model parameters based on a gradient method with a learning rate, the learning rate being dynamically determined as reversely related to the QP.

9. The video encoder of claim 8, wherein the target rate is determined based on a bit allocation or communication constraint.

10. The video encoder of claim 8, wherein the target rate is a target bit rate or target bits per pixel (bpp).

11. The video encoder of claim 8, wherein the image data unit is a group of pictures, an image frame, or a portion of an image frame.

12. The video encoder of claim 8, wherein a sliding window is configured with a sequence of reference image data units.

13. The video encoder of claim 12, wherein at least two of the sequence of reference image data units are encoded using at least one identical coding parameter.

14. The video encoder of claim 12, wherein the one or more model parameters are updated further based on an optimization of the rate control model over multiple sample points within the sliding window, wherein each sample point corresponds to a reference image data unit of the sequence of reference image data units.

15. One or more non-transitory computer-readable storage media storing computer-executable instructions that, when executed by a computing system, configure the computing system to perform operations comprising:
   obtaining a target rate for an image data unit to be encoded using one or more coding parameters, wherein the one or more coding parameters are determined based on the target rate and a rate control model associated with one or more model parameters, the one or more coding parameters including a quantization parameter (QP);

determining the one or more model parameters associated with the rate control model based on an encoding of one or more reference image data units using one or more reference coding parameters;

determining the one or more coding para ers for encoding the image data unit based on the target rate and the rate control model associated with the one or more determined model parameters;

using the one or more determined coding parameters to encode the image data unit;

determining whether the image data unit contains a significant scene change, the image data unit being determined to contain the significant scene change in response to an intra-predicting block ratio in encoding the image data unit being above a threshold, the intra-predicting block ratio being defined as a ratio based on a number of intra-predicting blocks in encoding an image frame updating the one or more model parameters based on a gradient method with a learning rate, the learning rate being dynamically determined as reversely related to the QP.

16. The method of claim 1, wherein the learning rate is dynamically determined as $1/(QP^2+1)$.

17. The video encoder of claim 8, wherein the learning rate is dynamically determined as $1/(QP^2+1)$.

18. The method of claim 1, wherein the target rate is target bits per pixel (bpp).

* * * * *